United States Patent [19]

Nomura

[11] Patent Number: 4,984,659
[45] Date of Patent: Jan. 15, 1991

[54] ELEVATOR CONTROL APPARATUS

[75] Inventor: Masami Nomura, Inazawa, Japan

[73] Assignee: Mitsubishi Denki Kabushiki Kaisha, Japan

[21] Appl. No.: 302,947

[22] Filed: Jan. 30, 1989

[30] Foreign Application Priority Data

Feb. 1, 1988 [JP] Japan ................................ 63-21520
Oct. 18, 1988 [JP] Japan ................................ 63-260642

[51] Int. Cl.$^5$ ............................................. B66B 1/32
[52] U.S. Cl. .................................................. 187/108
[58] Field of Search ............... 187/108, 112; 361/154; 318/478

[56] References Cited

U.S. PATENT DOCUMENTS

4,368,501  1/1983  Gingrich ........................ 187/108 X
4,659,969  4/1987  Stupak, Jr. ..................... 361/154 X
4,706,619  11/1987 Buchl ............................. 361/154 X
4,729,056  3/1988  Edwards et al. ................ 361/154 X
4,764,840  8/1988  Petrie et al. .................... 361/154

Primary Examiner—A. D. Pellinen
Assistant Examiner—W. E. Duncanson, Jr.
Attorney, Agent, or Firm—Leydig, Voit & Mayer

[57] ABSTRACT

An elevator control apparatus includes a brake having a brake coil which is energized in response to a start signal to release the braking force exerted by the brake. A current sensor detects the current flowing through the brake coil and generates an actuating signal when the brake coil current changes due to the brake being released. The actuating signal causes a drive circuit to supply current to a motor for driving an elevator cage. As a result, the elevator cage can be smoothly started.

16 Claims, 7 Drawing Sheets

ELEVATOR CONTROL APPARATUS

BACKGROUND OF THE INVENTION

This invention relates to an elevator control apparatus. More particularly, it relates to an elevator control apparatus actuated at the start of an elevator cage under the condition that an electromagnetic brake is reliably operating.

Figure 9:
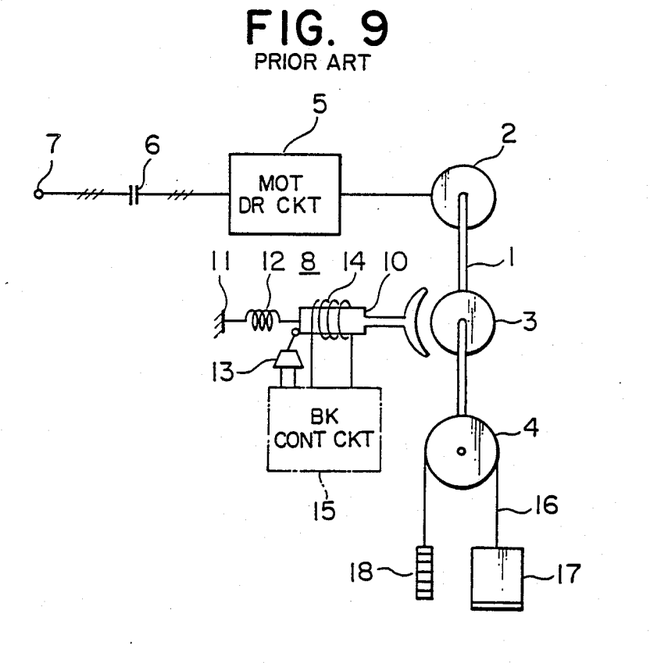
FIG. 9 is a schematic view of a known elevator control apparatus.

FIG. 9 is a schematic view showing the construction of a conventional elevator system As shown in the figure, the elevator system comprises a common rotary shaft 1, on which a motor 2, a wheel to be braked 3 and a sheave 4 are mounted at suitable intervals. The motor 2 is electrically connected with a motor drive circuit 5, which in turn is connected to a three-phase A.C. power source 7 through the contact 6 of an electromagnetic contactor (not shown). An electromagnetic brake 8 is constructed of a lining 9 which grasps and brakes the wheel to be braked 3, a plunger 10 which is attached to the lining 9, a compression spring 12 which is interposed between the plunger 10 and a base 11, a switch 13 which turns on or off in coordination with the movement of the plunger 10, and a coil 14 which is wound round the plunger 10. Owing to the force of the spring 12, the electromagnetic brake 8 brakes the wheel to be braked 3 by means of the lining 9 through the plunger 10. When the coil 14 is energized by a brake control circuit 15, the plunger 10 is attracted and overcomes the urging force of the spring 12, thereby to separate the lining 9 from the wheel to be braked 3 and to releasing the braking of the wheel. Wound round the sheave 4 is a rope 16, one end of which has an elevator cage 17 coupled thereto and the other end of which has a counterweight 18 coupled thereto.

In starting the elevator cage 17, the aforementioned contact 6 and the contact 19a (in FIG. 10 to be referred to below) of the brake control circuit 15 are closed, whereby the braking by the electromagnetic brake 8 is released, and electric power for generating torque is supplied from the power source 7 to the motor 2 by the motor drive circuit 5.

Figure 10:
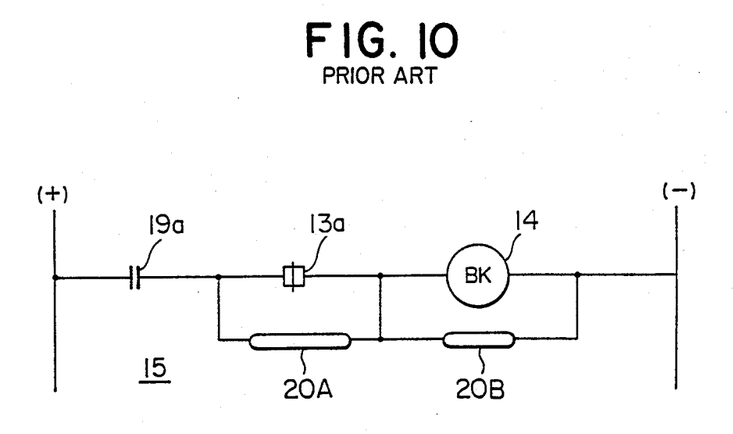
FIG. 10 is a circuit connection diagram of a known brake control circuit.

FIG. 10 is a circuit diagram of the brake control circuit 15 shown in FIG. 9. Contact 19a of an electromagnetic contactor (not shown) which is closed at the start of the elevator cage 17 but which is open when the cage 17 is stopped contact 13a of the aforementioned switch 13, and coil 14 are connected in series with one another across the plus (+) and minus (−) sides of a power source (not shown). Contact 13a is in a closed state in order to connect the coil 14 directly to the power source for the reason that, until the plunger 10 is attracted upon the energization of the coil 14 of the electromagnetic brake 8, the coil 14 requires a great current for overcoming the urging force of the spring 12. Subsequently, once the plunger 10 has been attracted, contact 13a falls into an open state because the attracted state of the plunger 10 can be maintained even with a decreased coil current. At this time, a current limiting resistor 20A connected in parallel with the contact 13a is operatively connected to the coil 14, whereby the current flowing through this coil is decreased. A resistor 20B connected in parallel with the coil 14 is a coil protecting resistor by which electromagnetic energy stored in the coil 14 is absorbed when the coil current is cut off.

In starting the elevator cage 17, the electromagnetic contactor contact 19a is closed, and the coil 14 of the electromagnetic brake 8 is connected to the power source through the switch contact 13a as well as the electromagnetic contactor contact 19a. Thus, the coil 14 is energized to attract the plunger 10, so that the lining 9 releases the braking of the wheel to be braked 3. The motor 2 begins to rotate, and the elevator cage 17 starts smoothly. Since, at this time, the contact 13a of switch 13 interlocked with the plunger 10 opens, the coil current flows from the plus (+) side of the power source to the minus (−) side thereof via the electromagnetic contactor contact 19a, current limiting resistor 20A and coil 14, and the current flowing through the coil 14 is limited by the current limiting resistor 20A. As a result, the generation of heat by coil 14 is suppressed, and the consumption of electric power in the coil 14 is also suppressed.

In the operation of the above-described elevator control apparatus when the elevator cage is to be started, the motor sometimes generates torque while the braking force of the brake is still acting. In this case, the moment the brake has been completely released and the braking force disappears, the elevator cage is abruptly accelerated, and the riding quality of the cage is impaired. Moreover, since the switch contact of the brake control circuit is a mechanical contact, inferior touch is intrisically liable to occur, and inferior touch ascribable to the improper adjustment of the contact is also liable to occur. Therefore, the coil current is already limited during the attraction of the plunger Accordingly, the motor might rotate with the plunger held unattracted, namely, with the lining touching the wheel to be braked. In such a situation, abnormal wear of the lining, etc. will occur, and the brake will fail to work, and cause a serious accident. Therefore, the inspection of the switch contact is always required, and the maintenance of the contact is laborious.

SUMMARY OF THE INVENTION

This invention has been made in order to solve the problems mentioned above, and has for its object to provide an elevator control apparatus in which a motor is energized after acknowledging that current is flowing through a brake coil, thereby to smoothly perform a shift from the braking force of a brake to the torque of the motor, and in which the brake current is detected by deciding whether or not a plunger has actually operated, to monitor the braking operation of the brake so as to prevent the burnout of the motor and the abnormal wear of the lining of the brake.

BRIEF DESCRIPTION OF THE DRAWINGS

Throughout the drawings, the same symbols indicate identical or equivalent portions

DESCRIPTION OF THE PREFERRED EMBODIMENTS

In general, the current i flowing through the coil of an electromagnetic brake and the terminal voltage E of the coil (constant in this case) are defined by the following equation:

$$E = \frac{d}{dt}(L \cdot i) + R \cdot i \tag{1}$$

where L denotes the inductance of the coil and R the resistance thereof. The inductance L in Eq. (1) is constant until the plunger of the electromagnetic brake operates, so that the current i obtained from Eq. (1) is expressed by the following well-known equation:

$$i = \frac{E}{R}\left(1 - e^{-\frac{t}{L/R}}\right) \tag{2}$$

Figure 4A:
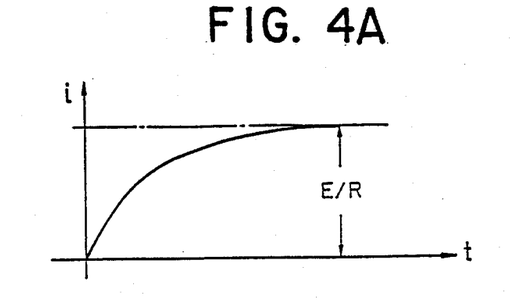
FIGS. 4A and 4B are diagrams of the coil current of an electromagnetic brake.

The variation of this current i versus time t becomes as illustrated in FIG. 4A. On the other hand, when the plunger is attracted overcomes the biasing force of the spring of the electromagnetic brake, the inductance L changes. That is, the following equation is obtained from Eq. (1):

$$E = \left(\frac{d}{dt}L\right)i + \left(\frac{d}{dt}i\right)L + R \cdot i \tag{3}$$

Figure 4B:
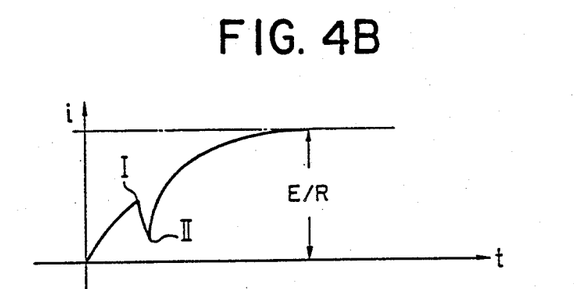

Here, the differential term of the first term on the right side of Eq. (3) can be rewritten as follows:

$$\frac{d}{dt}L = \frac{dx}{dt} \cdot \frac{d}{dx}L(x) \tag{4}$$

where x denotes the dimension of the air gap of the plunger, and L(x) signifies that the inductance L is a function of the dimension x of the air gap. Accordingly, $$\frac{dx}{dt}$$

is the speed at which the plunger moves, while $$\frac{d}{dx}L(x)$$

is a quantity which expresses the change of the inductance L versus the change of the air gap and which becomes a negative value in this case. Consequently, in the case where the plunger is attracted, the variation of the current i becomes as illustrated in FIG. 4B. More specifically, the current i increases according to Eq. (1) from point 0 to point I, and it decreases from point I to point II in accordance with Eqs. (3) and (4) when the plunger is attracted. When the plunger has been fully attracted, the current i gradually increases from point II in accordance with Eq. (1) which gives the inductance in that state.

Accordingly, when a change in the current i depicted in FIG. 4B is detected, it can be sensed that the brake has been released.

Figure 1:
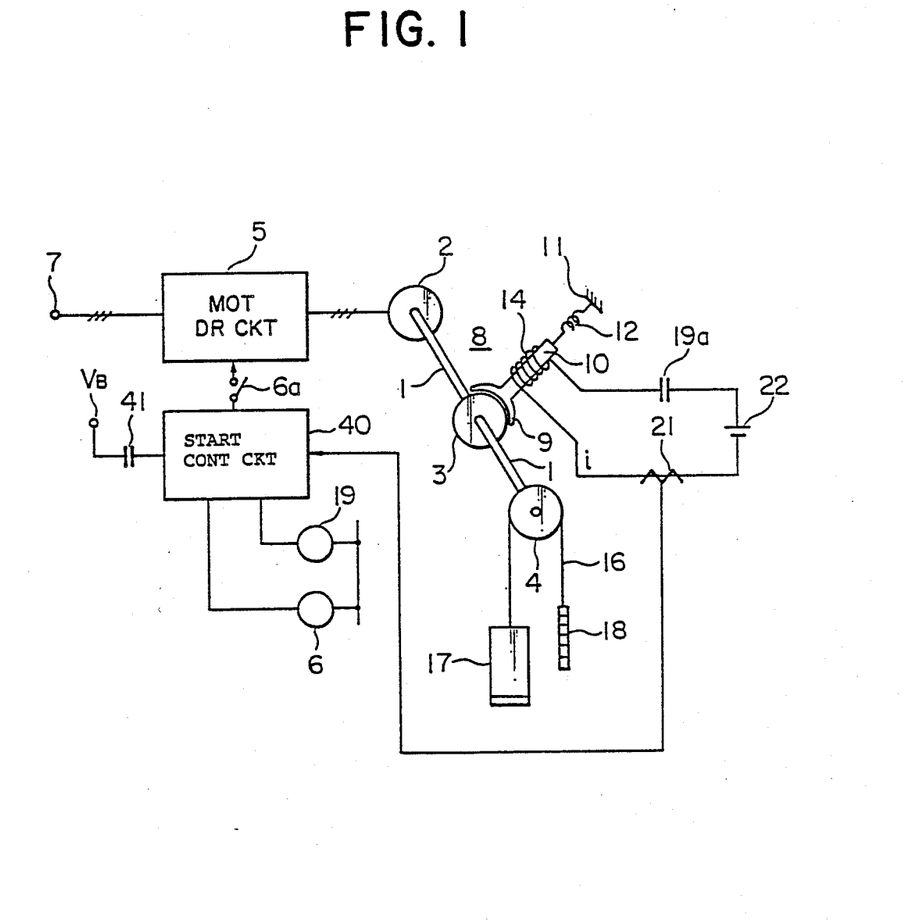
FIG. 1 is a schematic view of an elevator control apparatus according to this invention.
Figure 2:
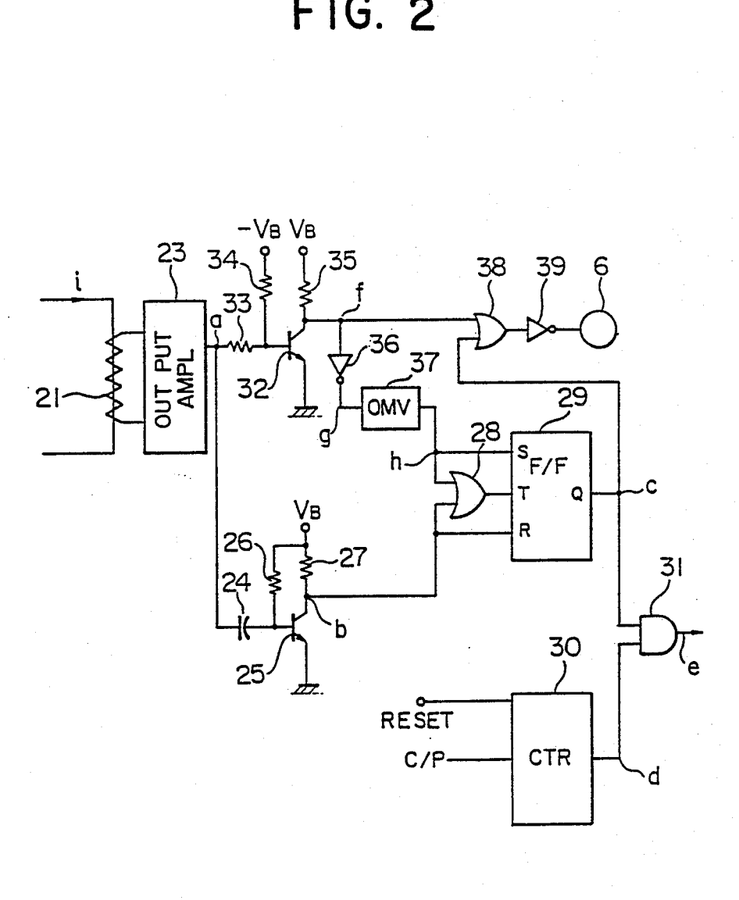
FIG. 2 is a circuit diagram showing an embodiment of a start control circuit.

FIG. 1 is a schematic view of an elevator control apparatus according to this invention, and FIG. 2 is a circuit diagram of an embodiment of a start control circuit.

In FIG. 1, numeral 21 designates a current sensor which senses the current i of the circuit of a brake coil 14, and numeral 22 a D.C. power source. In FIG. 2, numeral 23 designates the output amplifier of the current sensor 21, numeral 24 a capacitor which is set so as to detect only the varying component of a voltage, and numeral 25 a signal amplifying transistor which constitutes second current detection means together with the capacitor 24. Resistors 26 and 27 are set at optimal resistances so that the transistor 25 may be operated as an amplifier and may be rendered conductive when the output of the output amplifier 23 is not less than a voltage $V_k$ illustrated in FIG. 3A (to be referred to later). Numeral 28 indicates an OR circuit, and numeral 29 an RST flip-flop circuit (hereinbelow, termed "F/F circuit"). A counter 30 receives a RESET signal upon the closure of a start command contact 41 in FIG. 1 and counts clock pulses (C/P) since that time so as to deliver a high potential signal (hereinbelow, termed "H signal") when a predetermined value has been reached. Thus, the counter 30 functions as a timer means. An AND circuit 31 functions as a fault finding circuit. An amplifying transistor 32 functions as first current detection means. Resistors 33, 34 and 35 are set at optimal resistances so as to operate the transistor 32 when the output of the output amplifier 23 is not less than the voltage $V_k$. Numeral 36 denotes a NOT circuit, numeral 37 a one-shot multivibrator (hereinbelow, termed "OMV"), numeral 38 an OR circuit, and numeral 39 a NOT circuit. Symbol $V_B$ indicates a positive voltage source, and symbol $-V_B$ a negative voltage source. Letters a-h indicate the respective points of illustrated positions, the corresponding signals of which are shown in FIGS. 3A -3H.

The embodiment constructed as described above operates as follows.

Figure 3A:
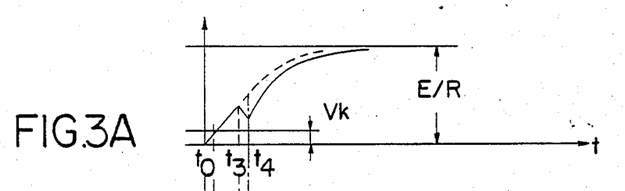
FIGS. 3A thru 3H are diagrams for explaining the operation of the embodiment in FIG. 2.

When contact 19a is closed in the same manner as stated in the prior-art example FIG. 9, the brake current i flows. This current i is sensed by the current sensor 21, and a signal shown in FIG. 3A is delivered to the output point a of the output amplifier 23. As stated in conjunction with FIGS. 4A and 4B, the signal corresponds to the case where a plunger 10 has been normally attracted.

Figure 3B:
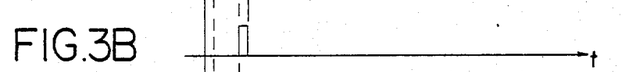
Figure 3C:
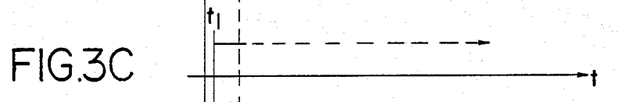
Figure 3D:
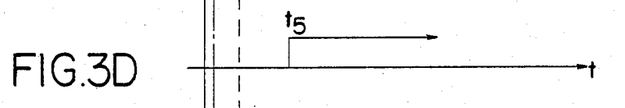
Figure 3E:
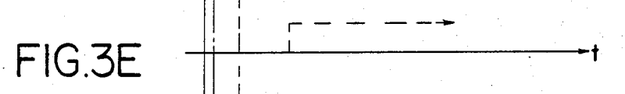
Figure 3F:
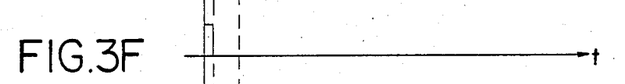
Figure 3G:
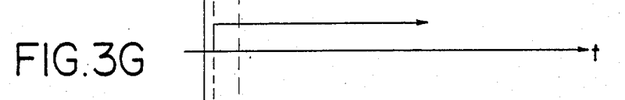
Figure 3H:
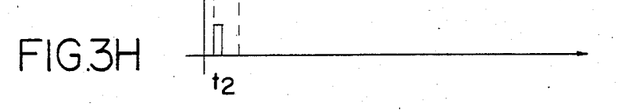

More specifically, when the contact 19a is closed at time $t_o$ and the voltage of point reaches $V_k$ at a time $t_1$, the transistor 32 is rendered conductive, and its output at the point f having been an H signal till then becomes a low potential signal (hereinbelow, termed "L signal"). As a result, the output (point g) of the NOT circuit becomes an H signal as shown in FIG. 3G. Owing to this H signal, an OMV 37 generates the H signal for a short time interval (from time $t_1$ to time $t_2$) as shown in FIG. 3H. The H signal of the OMV 37 is directly applied to the set terminal S of the F/F circuit 29, and is applied to the clock terminal T thereof through the OR circuit 28. Thus, the H signal is provided from the terminal Q of the F/F circuit 29 as shown in FIG. 3C.

The voltage of point a decreases for an interval from time $t_3$ to a time $t_4$, during which the attraction of the plunger 10 takes place. Meantime, the transistor 25 is nonconductive, so that point b produces an H signal as shown in FIG. 3B. Owing to this H signal, the F/F circuit 29 is reset to produce an L signal at point c. On the other hand, the counter 30 is timed for counting after the closure of the start command contact 41, and it is operated at a time $t_5$ to produce an H signal at point d. Since, however, points c and d are not simultaneously supplied with the H signals, the output point e of the AND circuit 31 does not become the H signal. This signifies that the brake 8 is normal.

Meanwhile, an electromagnetic contactor 6 which actuates a motor drive circuit 5 so as to give the command of supplying a motor 2 with electric power for generating a rotating torque is energized for the first time when point f has an L signal, that is, when a start command has been issued, and when, point c has an L signal, that is, when the attraction of the plunger 10 has been detected. In other words, the electromagnetic contactor 6 is energized after the output of the OR circuit 38 becomes an L signal and renders the output of the NOT circuit 39 an H signal. Owing to the energization, the motor drive circuit 5 is turned on through the contact 6a of the electromagnetic contactor 6, whereupon the motor 2 generates rotating torque.

Thus, the motor 2 is driven at the same time that the brake 8 is released Therefore, the motor 2 is not turned on with the brake 8 working, and the rotating torque is not generated later than the release of the brake 8, either.

Now, there will be described a case where no current flows through the brake coil 14 and a case where the plunger 10 does not operate normally. First, in the case where no current flows through the brake coil 14, the signal of point f remains an H signal, the output of the NOT circuit 39 remains an L signal, and the electromagnetic contactor 6 is not energized, so that an elevator cage 17 is prevented from starting. Besides, even when current flows, the signal of point continues to increase uniformly after the time $t_3$ as indicated by a broken line in FIG. 3A in the case where the plunger 10 is not attracted. Therefore, the transistor 25 remains conductive, and the output at point b remains an L signal. Meanwhile, the F/F circuit 29 holds its set status for the reason that it has been set by the output of OMV 37 to turn the point c into an H signal at the time $t_1$, after which the output at point b still remains an L signal. Consequently, the output at point c remains an H signal even after time $t_3$ as indicated by the dashed line in FIG. 3C. When the output of the counter 30 becomes an H at the time $t_5$, the output at point e of the AND circuit 31 becomes an H signal as indicated by the dashed line in FIG. 3E.

The bad condition of the brake 8 is known from the fact that the output at point e has become an H signal. On the basis of this signal, the elevator cage 17 is stopped, and an indication of the bad condition of the brake 8 is sent to a protective device (not shown), whereby any accident attendant upon the bad condition of the brake 8 can be prevented from occurring.

Moreover, since the output at point c does not become an L signal, the electromagnetic contactor 6 is not energized. Accordingly, when the brake 8 is not released, the motor 2 is not started, and hence, it does not burn out.

The above embodiment has been described as energizing the motor 2 after the release of the brake 8. In this case, the generation of torque by the motor 2 involves some delay from the point of time of the energization. When, in anticipation of the delay component, the motor 2 is energized at a proper timing which precedes the release of the brake 8, the period of time from the issue of the start command till the actual start of the elevator cage 17 can be shortened, and a shift from the braking force of the brake 8 to the torque of the motor 2 can be smoothly effected. By way of example, in the circuit arrangement of FIG. 2, the electromagnetic contactor 6 is directly connected to point g and is actuated by the conduction of the transistor 32 so as to energize the motor 2. Moreover, time $t_1$ at which the transistor 32 becomes conductive is adjusted so that, when the motor 2 is energized at time $t_1$, it will produce a torque just corresponding to the load at time $t_4$ at which the braking force becomes null. Thus, a prompt start can be attained in addition to a smooth start.

In the embodiment described above, the brake coil 14 is excited with direct current. However, the excitation of the brake coil 14 with alternating current can be similarly performed by sensing a decrease in the excitation current which decreases as the plunger 10 is attracted. By way of example, the circuit arrangement shown in FIG. 2 can be altered in such a way that the sensed result of the current sensor 21 is rectified and converted into direct current.

Figure 5:
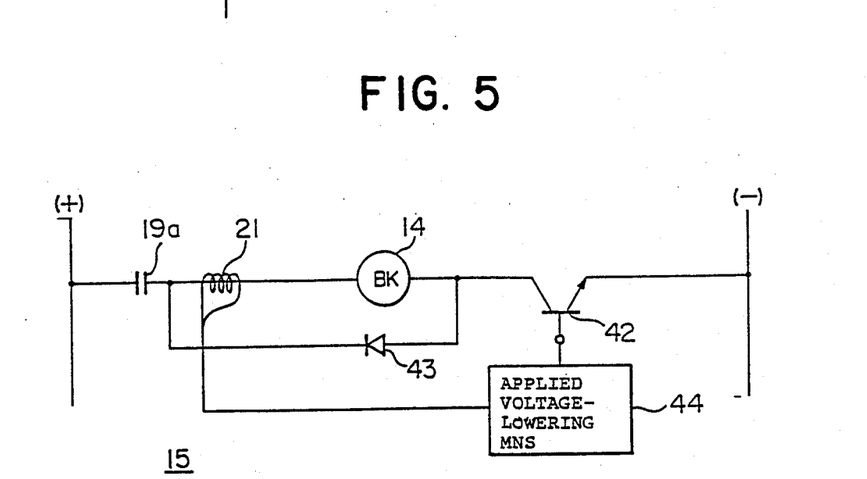
FIG. 5 is a circuit diagram showing an embodiment of a brake control circuit.

FIG. 5 is a circuit diagram showing an embodiment of a brake control circuit. In this brake control circuit 15, the contact 19a of an electromagnetic contactor 19, the coil 14, and a semiconductor switching element, such as a collector-emitter circuit of a power transistor 42 are connected in series across the plus (+) and minus (−) sides of a power source (not shown). A flywheel diode 43 is connected in parallel with the coil 14. This diode is used instead of the coil protecting resistor 20B in FIG. 10, and it improves the continuity of the coil current. The series circuit mentioned above is provided with a current sensor 21 which senses the current flowing through the coil 14. An applied voltage-lowering means 44 is connected between the current sensor 21 and the base of the power transistor 42. This means 44 performs pulse width control of the power transistor 42 limit the coil current and to lower the applied voltage of the coil 14.

Figure 6:
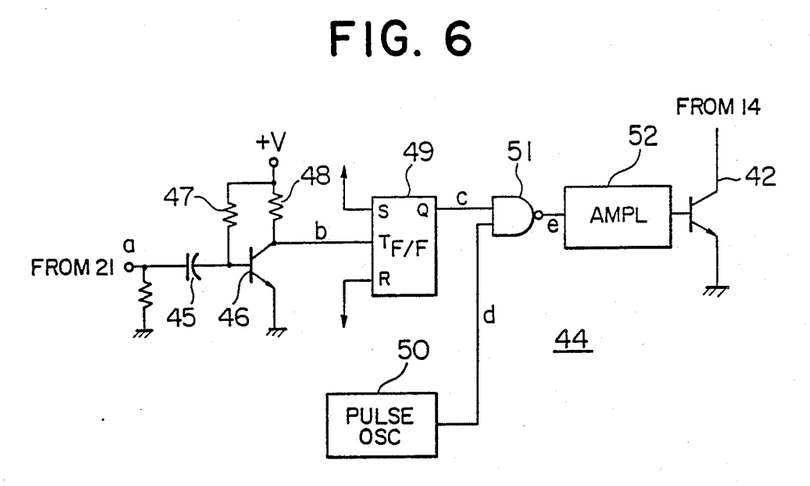
FIG. 6 is a circuit diagram showing an embodiment of applied voltage-lowering means in FIG. 5.

FIG. 6 is a circuit diagram of the applied voltage-lowering means 44 shown in FIG. 5, and FIGS. 7A-7E are waveform diagrams showing outputs at respective points a-e in FIG. 6. The applied voltage-lowering means 44 illustrated in FIG. 6 comprises a capacitor 45 which transmits only the varying component of the output point a (refer to FIG. 7A) of the current sensor 21 in FIG. 5, a transistor 46 which amplifies the varying component, a base bias resistor 47 and a load resistor 48 for transistor 46, an RST flip-flop 49 which provides the output of point c (refer to FIG. 7C) corresponding to a variation at output point b (refer to FIG. 7B) of transistor 46, a pulse oscillator 50 which delivers pulses of fixed pulse width (refer to FIG. 7D), a NAND gate 51, and an amplifier 52 which amplifies the output of output point e (refer to FIG. 7E) of the NAND gate 51 and then delivers an output. The capacitor 45 is connected between the input terminal IT of the means 44 and the base of the transistor 46. This transistor 46 has its emitter grounded, has its collector connected to a supply voltage +V through the load resistor 48, and has its base connected to the supply voltage +V through the base bias resistor 47. The RST flip-flop 49 has its input terminal T connected to the collector of the transistor 46, and has its output terminal Q connected to one input terminal of the NAND gate 51. The other input terminal of the NAND gate 51 is connected to the pulse oscillator 50, and the output terminal thereof is connected to the base of the power transistor 42 in FIG. 5 through the amplifier 52.

Figure 7A:
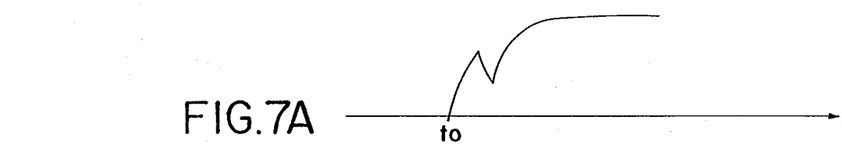
FIGS. 7A thru 7E are diagrams for explaining the operation of the embodiment in FIG. 6.
Figure 7B:
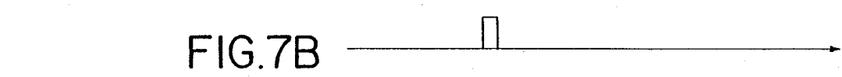
Figure 7C:
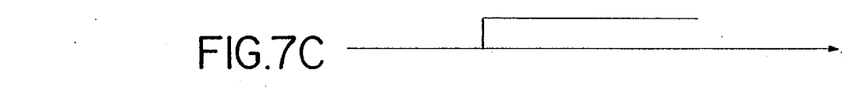
Figure 7D:
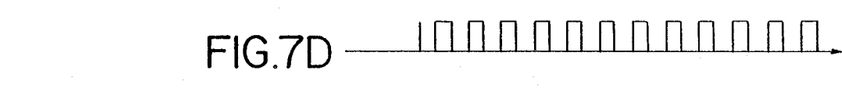
Figure 7E:
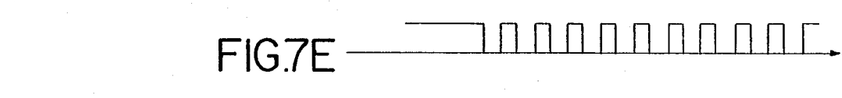

In operation, at the same time that, upon the entry of a cage start command, the motor 2 shown in FIG. 1 is connected to a three-phase power source 7 through the motor drive circuit 5, the electromagnetic contactor contact 19a shown in FIG. 5 is closed, and current begins to flow through the coil 14 (refer to FIG. 7A). At this point of time $t_o$, the output of point c of the flip-flop 49 in FIG. 6 is at a low level, as seen from FIG. 7C. Accordingly, the output of point e of the NAND gate 51 and the output of the amplifier 52, namely, the base input of the power transistor 42 become a high level, which renders the power transistor 42 conductive. As a result, the coil current increases as seen from FIG. 7A, and the attractive force of the plunger 10 overcomes the biasing force of a spring 12, so that the plunger 10 moves. When the plunger 10 moves, the coil current changes abruptly as illustrated in FIG. 7A in the manner stated before, and hence, the output of the point b of the transistor 46 becomes a pulse-shaped output as shown in FIG. 7B. When the pulse-shaped output is impressed on the input terminal T of the flip-flop 49, this flip-flop 49 changes over the output of output point c from a low level to a high level and applies the high level output to one input terminal of the NAND gate 51. In consequence, the output of point d of the pulse oscillator 50 which is applied to the other input terminal of the NAND gate 51 is passed by the NAND gate 51, and the output of point e of the NAND gate 51 becomes recurrent pulses of high and low level. These pulses are amplified by the amplifier 52, and are thereafter input to the base of the power transistor 42. Therefore, the power transistor 42 is repeatedly turned ON and OFF, whereby the average voltage to be applied to the coil 14 is lowered, and the current flowing through the coil 14 is limited.

Figure 8:
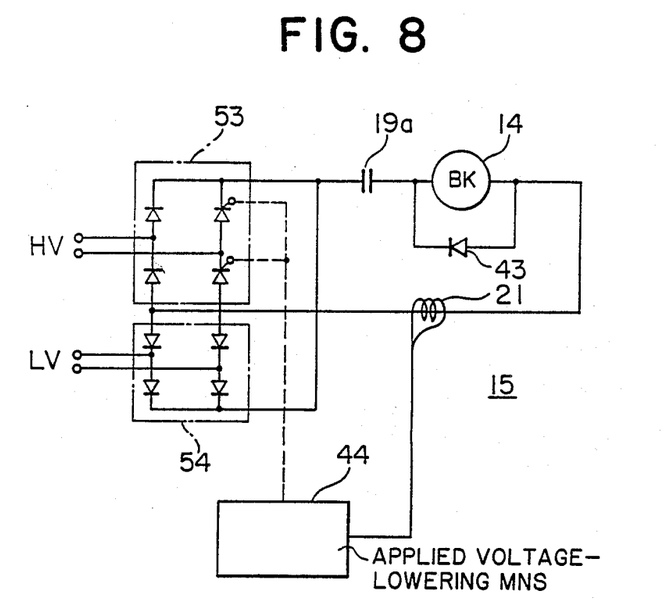
FIG. 8 is a circuit diagram showing another embodiment of the brake control circuit.

FIG. 8 is a circuit diagram showing another embodiment of the brake control circuit. Like the foregoing brake control circuit 15 in FIG. 5, the brake control circuit 15 of this embodiment employs an electromagnetic contactor contact 19a and a coil 14 which are connected in series across both the terminals of the power source. However, this embodiment differs from the foregoing embodiment in that the power transistor 42 is replaced with a first rectifier circuit 53 which is constructed of a hybrid bridge including semiconductor switching elements, such as, thyristors and diodes, a high-voltage A.C. power source HV which is connected on the input side of the first rectifier circuit 53, a second rectifier circuit 54 which is constructed of a bridge including semiconductor elements, such as, only diodes, and a low-voltage A.C. power source LV which is connected on the input side of the second rectifier circuit 54. In addition, the applied voltage-lowering means 44 is connected between the current sensor 21 and the gates of the thyristors in the first rectifier circuit 53.

With the brake control circuit 15 thus constructed, in starting the elevator cage 17, the applied voltage-lowering means 44 ignites the thyristors in the first rectifier circuit 53, and the electromagnetic contactor contact 19a is closed. Then, a coil current flows through a series circuit which extends from the high voltage A.C. power source HV via the first rectifier circuit 53, electromagnetic contactor contact 19a, coil 14 and first rectifier circuit 53 back to the high-voltage A.C. power source HV. Subsequently, when the plunger 10 is attracted and the current sensor 21 senses the changes of the coil current, the applied voltage-lowering means 44 extinguishes the thyristors. At this time, decreased coil current flows through a series circuit which extends from the low-voltage A.C. power source LV, via the second rectifier circuit 54, electromagnetic contactor contact 19a, coil 14 and second rectifier circuit 54 back to the low-voltage A.C. power source LV, and the voltage applied to the coil 14 is lowered.

As described above in detail, this invention is free of the problems of inferior touch and improper adjustments caused by a mechanical contact, so the elevator control apparatus of the invention is advantageous with respect to reliability and in cost. Moreover, since a chopper system in which a semiconductor device switched on and off is adopted, a large installation space is not required and the problem of heat generation is not involved unlike a current limiting resistor, so that the apparatus can be reduced in size.

I claim:
1. An elevator control apparatus comprising:
a brake in which a brake coil is deenergized, thereby to generate a braking force so as to brake an elevator cage, and said brake coil is energized in response to a start command signal, thereby to release the braking force;
current sensing means for sensing change in a current of said brake coil as based on change in an inductance thereof after the current has reached a predetermined value, and delivering an actuating signal, when the braking force of said brake is released; and
a drive circuit which, when supplied with the actuating signal, feeds electric power for generating a rotating torque to a motor for driving said elevator cage.

2. An elevator control apparatus according to claim 1, wherein:
said current sensing means is constructed of first, second and third current detection means;
said first current detection means delivers a first detection signal when the current flowing through said brake coil has reached the predetermined value;
said second current detection means delivers a second detection signal upon detecting the change of the current as based on the change of the inductance of said brake coil; and
said third current detection means delivers the actuating signal when both the first and second detection signals are supplied thereto.

3. An elevator control apparatus according to claim 2, wherein said first current detection means includes a transistor which receives the current flowing through said brake coil as an input of its control electrode and which is rendered conductive when the input has reached a predetermined value.

4. An elevator control apparatus according to claim 2, wherein said second current detection means includes:

a capacitor which receives the current flowing through said brake coil at one electrode thereof;

a transistor whose control electrode is connected to the other electrode of said capacitor; and a flip-flop which delivers the second detection signal when said transistor is rendered conductive.

5. An elevator control apparatus according to claim 2, wherein said third current detection means includes:

an OR gate which receives as one input thereof the output of said first current detection means and as the other input thereof the output of said second current detection means; and an inverter which is connected to an output end of said OR gate.

6. An elevator control apparatus comprising:

a brake having a brake coil that is deenergized to generate a braking force to brake an elevator cage and is energized in response to a start command signal to release the braking force;

current detection means for detecting a drop in the current flowing through said brake coil and delivering a detection signal when the braking force of said brake is released; and a fault finding circuit which is actuated when the detection signal is not delivered upon lapse of a predetermined time interval after generation of the start command signal.

7. An elevator control apparatus according to claim 6, wherein said fault finding circuit includes:

timer means for measuring a time interval after the generation of the start command signal and delivering a signal upon the lapse of the predetermined time interval; and an AND gate which receives as one input the output of said timer means and as another input the output of said current detection means.

8. An elevator control apparatus according to claim 6, wherein said current detection means includes:

a capacitor having a first electrode connected to said brake coil anda second electrode;

a transistor having a control electrode connected to second electrode of said capacitor; and a flip-flop which delivers the detection signal when said transistor is rendered conductive.

9. An elevator control apparatus comprising:

a brake having a brake coil that is deenergized to generate a braking force to brake an elevator cage and is energized in response to a start command signal to release the braking force; and voltage-control means for lowering the voltage applied to said brake coil upon detecting a drop in the current flowing through said brake coil when the braking force of said brake is released.

10. An elevator control apparatus according to claim 9, wherein said voltage-control means includes:

a transistor directly connected to said brake coil; and voltage-lowering means having an output portion connected to a control electrode of said transistor.

11. An elevator control apparatus according to claim 10, wherein said voltage-lowering means delivers a pulse signal upon sensing a drop in the current of said brake coil.

12. An elevator control apparatus according to claim 10, wherein said voltage-lowering means includes:

current detection means for generating a detection signal upon detecting a drop in the current of said brake coil;

a pulse oscillator; and a gate which is enable to pass the output of said pulse oscillator when the detection signal is generated.

13. An elevator control apparatus according to claim 12, wherein said current detection means includes:

a capacitor having a first electrode connected to said brake coil and a second electrode;

a transistor having a control electrode connected to the second electrode of said capacitor; and a flip-flop which generates the detection signal when said transistor is rendered conductive.

14. An elevator control apparatus comprising:

a brake which has a brake coil and which moves between a released position when the brake coil is energized and an applied position when the brake coil is deenergized;

a voltage supply which applies a voltage to the brake coil;

a current sensor for sensing the current flowing through the brake coil and generating an actuating signal when it detects a drop in the brake coil current due to release of the brake; and voltage control means for lowering the voltage applied to the brake coil by the voltage supply in response to the actuating signal.

15. An elevator control apparatus as claimed in claim 14 wherein the voltage control means comprises means for controlling the voltage supply to apply a constant voltage to the brake coil before an actuating signal is generated and to apply a pulsed voltage after an actuating signal is generated.

16. An elevator control apparatus as claimed in claim 15 wherein the voltage control means comprises:

a flip-flop responsive to the actuating signal for generating an output signal that changes from a first level to a second level when the actuating signal is generated;

a pulse oscillator that generates an oscillating output signal;

a gate which receives the output signals of the flip-flop and the pulse oscillator and passes the output signal of the flip-flop when the output signal of the flip-flop has the first level and passes the output signal of the pulse oscillator when the output signal of the flip-flop has the second level; and a switching element connected in series with the brake coil and controlled by the output of the gate.

* * * * *

UNITED STATES PATENT AND TRADEMARK OFFICE
CERTIFICATE OF CORRECTION

PATENT NO. : 4,984,659

DATED : January 15, 1991

INVENTOR(S) : Masami Nomura

It is certified that error appears in the above-identified patent and that said Letters Patent is hereby corrected as shown below:

Column 9, line 42, change "anda" to --and a--;
line 43, after "to" insert --the--.

Column 10, line 13, change "enable" to --enabled--.

Signed and Sealed this

Eighteenth Day of August, 1992

*Attest:*

DOUGLAS B. COMER

*Attesting Officer*     *Acting Commissioner of Patents and Trademarks*